United States Patent
Sadjadi et al.

(10) Patent No.: US 12,504,524 B2
(45) Date of Patent: Dec. 23, 2025

(54) METHODS AND SYSTEMS FOR LIDAR MONITORING

(71) Applicant: GM GLOBAL TECHNOLOGY OPERATIONS LLC, Detroit, MI (US)

(72) Inventors: Hossein Sadjadi, Thornhill (CA); Ehsan Jafarzadeh, Toronto (CA); Zachary T. Kroeze, Toronto (CA)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 239 days.

(21) Appl. No.: 18/329,131

(22) Filed: Jun. 5, 2023

(65) Prior Publication Data

US 2024/0402317 A1  Dec. 5, 2024

(51) Int. Cl.
| | |
|---|---|
| *G01S 7/497* | (2006.01) |
| *B60W 50/00* | (2006.01) |
| *B60W 50/02* | (2012.01) |
| *B60W 50/029* | (2012.01) |
| *G01S 17/931* | (2020.01) |

(52) U.S. Cl.
CPC .......... *G01S 7/497* (2013.01); *B60W 50/0205* (2013.01); *B60W 50/029* (2013.01); *G01S 17/931* (2020.01); *B60W 2050/0052* (2013.01); *B60W 2555/20* (2020.02)

(58) Field of Classification Search
CPC ..... B60W 2050/0052; B60W 2555/20; B60W 50/0205; B60W 50/029; G01S 17/931; G01S 7/497
See application file for complete search history.

(56) References Cited

U.S. PATENT DOCUMENTS

| | | | |
|---|---|---|---|
| 2022/0388545 A1* | 12/2022 | Chae | B60W 60/0015 |
| 2024/0142588 A1* | 5/2024 | Alismail | G01S 17/89 |
| 2024/0230866 A1* | 7/2024 | Ma | G06T 7/10 |

OTHER PUBLICATIONS

Levinson et al., Automatic Online Calibration of Cameras and Lasers, Stanford Artificial Intelligence Laboratory, Jun. 23, 2013. https://www.roboticsproceedings.org/rss09/p29.pdf (Year: 2013).*

\* cited by examiner

*Primary Examiner* — Kito R Robinson
*Assistant Examiner* — Rose Ridder
(74) *Attorney, Agent, or Firm* — Ingrassia Fisher & Lorenz, LLP | IF&L (57) ABSTRACT

Systems and methods are provided for controlling a vehicle. In one embodiment, a method includes: receiving, by the controller, return data generated by a lidar device of the vehicle; determining, by the controller, at least one overlapping channel of redundant return data; determining, by the controller, an optimization framework of equations based on modeled errors of the at least one overlapping channel; solving, by the controller, the optimization framework using a least squares method to determine an error value; determining, by the controller, a state of health of the lidar device based on the error value; compensating, by the controller, the return data from the lidar device based on the error value; and controlling, by the controller, the vehicle based on the compensated return data.

20 Claims, 4 Drawing Sheets

METHODS AND SYSTEMS FOR LIDAR MONITORING

INTRODUCTION

The present disclosure generally relates to lidar systems, and more particularly relates to systems and methods for monitoring the health of a lidar system and to provide error compensation based on the monitoring.

An autonomous vehicle is a vehicle that is capable of sensing its environment and navigating with little or no user input. An autonomous vehicle senses its environment using sensing devices such as radar, lidar, image sensors, and the like. The autonomous vehicle system further uses information from global positioning systems (GPS) technology, navigation systems, vehicle-to-vehicle communication, vehicle-to-infrastructure technology, and/or drive-by-wire systems to navigate the vehicle.

While autonomous vehicles and semi-autonomous vehicles offer many potential advantages over traditional vehicles, in certain circumstances it may be desirable for improved operation of the vehicles. For example, measurements from the lidar systems are monitored for overall accuracy. Lidar health monitoring systems typically evaluate stationary targets in a controlled environment. The health monitoring systems use known parameters of interest (e.g., reflectivity and distance) for establishing the state of health ground-truth. It is desirable to monitor the health of the lidar measurements without such a controlled environment.

Accordingly, it is desirable to provide improved systems and methods for monitoring the health of a lidar system and to provide error compensation based on the monitoring. Furthermore, other desirable features and characteristics of the present invention will become apparent from the subsequent detailed description and the appended claims, taken in conjunction with the accompanying drawings and the foregoing technical field and background.

SUMMARY

Systems and methods are provided for controlling a vehicle are provided. In one embodiment, a method includes: receiving, by a controller, return data generated by a lidar device of the vehicle; determining, by the controller, at least one overlapping channel of redundant return data; determining, by the controller, an optimization framework of equations based on modeled errors of the at least one overlapping channel; solving, by the controller, the optimization framework of equations using a least squares method to determine an error value; determining, by the controller, a state of health of the lidar device based on the error value; compensating, by the controller, the return data from the lidar device based on the error value; and controlling, by the controller, the vehicle based on the compensated return data.

In various embodiments, the method further includes determining whether enable conditions are met; and in response to determining that the enable conditions have been met, performing the steps of determining the plurality of overlapping channels, determining the optimization framework of equations, determining the state of health, and the compensating the return data.

In various embodiments, the enable conditions include weather conditions.

In various embodiments, the enable conditions include a relative motion of the vehicle.

In various embodiments, the enable conditions include a reflectivity condition.

In various embodiments, the method further includes maturing, by the controller, the error value over a plurality of frames; and generating a confidence value based on the maturing, and wherein the determining the state of health is based on the confidence value.

In various embodiments, the method includes pre-processing, by the controller, the return data in the at least one overlapping channel by applying a filter to at least one of remove no return points, remove saturated points, and remove outliers.

In various embodiments, the method includes extracting at least one feature from the at least one overlapping channel based on at least one of a mean and a median of at least one of a distance and a reflectivity of the return data.

In various embodiments, the extracting the at least one feature is based on at least one of all of the pre-processed channel data and a subset of the pre-processed channel data, wherein the subset is obtained from at least one of automatic clustering and samples after removing the outliers.

In various embodiments, the method includes modeling an error associated with at least one of reflectivity and distance of points of the at least one overlapping channel, and wherein the determining the optimization framework of equations is based on the error that is modeled.

In another embodiment, a control system for controlling a vehicle includes a computer readable medium configured to store return data generated by a lidar device of the vehicle; and a processor, onboard the vehicle. The processor is configured to, receive the return data, determine at least one overlapping channel of redundant return data, determine an optimization framework of equations based on modeled errors of the at least one overlapping channel, solve the optimization framework using a least squares method to determine an error value, determine a state of health of the lidar device based on the error value, compensate the return data from the lidar device based on the error value, and control the vehicle based on the compensated return data.

In various embodiments, the processor is further configured to determine whether enable conditions are met, and in response to determining that the enable conditions have been met, perform the steps of determining the plurality of overlapping channels, determining the optimization framework, determining the state of health, and the compensating the return data.

In various embodiments, the enable conditions include at least one of a weather condition, a relative motion of the vehicle condition, and a reflectivity condition.

In various embodiments, the processor is further configured to mature the error value over a plurality of frames, and generate a confidence value based on the maturing, and wherein the processor is configured to determine the state of health based on the confidence value.

In various embodiments, the processor is further configured to pre-process the return data in the at least one overlapping channel by applying a filter to at least one of remove no return points, remove saturated points, and remove outliers.

In various embodiments, the processor is further configured to extract at least one feature from the at least one overlapping channel based on at least one of a mean and a median of at least one of a distance and a reflectivity of the return data.

In various embodiments, the processor is further configured to extract the at least one feature based on at least one of all of the pre-processed channel data and a subset of the pre-processed channel data, wherein the subset is obtained from at least one of automatic clustering and samples after removing the outliers.

In various embodiments, the processor is further configured to determine model an error associated with at least one of reflectivity and distance of points of the at least one overlapping channel, and wherein the determining the optimization framework of equations is based on the error that is modeled.

In another embodiment a vehicle includes a lidar device configured to generate return data; and a controller. The controller is configured to, by a processor, receive the return data, determine at least one overlapping channel of redundant return data, determine an optimization framework of equations based on modeled errors of the at least one overlapping channel, solve the optimization framework using a least squares method to determine an error value, determine a state of health of the lidar device based on the error value, compensate the return data from the lidar device based on the error value, and control the vehicle based on the compensated return data.

In various embodiments, the controller is further configured to, by the processor, pre-process the return data in the at least one overlapping channel by applying a filter to at least one of remove no return points, remove saturated points, and remove outliers, extract at least one feature from the at least one overlapping channel based on at least one of a mean and a median of at least one of a distance and a reflectivity of the return data, model an error associated with at least one of reflectivity and distance of points of the at least one overlapping channel, and wherein the determining the optimization framework of equations is based on the error that is modeled.

DESCRIPTION OF THE DRAWINGS

The exemplary embodiments will hereinafter be described in conjunction with the following drawing figures, wherein like numerals denote like elements, and wherein.

DETAILED DESCRIPTION

The following detailed description is merely exemplary in nature and is not intended to limit the application and uses. Furthermore, there is no intention to be bound by any expressed or implied theory presented in the preceding technical field, background, brief summary or the following detailed description. As used herein, the term module refers to any hardware, software, firmware, electronic control component, processing logic, and/or processor device, individually or in any combination, including without limitation: application specific integrated circuit (ASIC), an electronic circuit, a processor (shared, dedicated, or group) and memory that executes one or more software or firmware programs, a combinational logic circuit, and/or other suitable components that provide the described functionality.

Embodiments of the present disclosure may be described herein in terms of functional and/or logical block components and various processing steps. It should be appreciated that such block components may be realized by any number of hardware, software, and/or firmware components configured to perform the specified functions. For example, an embodiment of the present disclosure may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments of the present disclosure may be practiced in conjunction with any number of systems, and that the systems described herein are merely exemplary embodiments of the present disclosure.

For the sake of brevity, conventional techniques related to signal processing, data transmission, signaling, control, and other functional aspects of the systems (and the individual operating components of the systems) may not be described in detail herein. Furthermore, the connecting lines shown in the various figures contained herein are intended to represent example functional relationships and/or physical couplings between the various elements. It should be noted that many alternative or additional functional relationships or physical connections may be present in an embodiment of the present disclosure.

In one or more exemplary embodiments described herein, a vehicle capable of autonomous operation includes a number of different devices, such as a lidar device, which generate data representative of a scene or environment in a vicinity of the vehicle from different perspectives. The data from the lidar device is collected and monitored to identify and compensate for errors identified within the data. The monitoring is performed in real-time without the need for a controlled environment.

For example, as described in greater detail below in the context of FIGS. 1-4, in exemplary embodiments, a lidar system shown generally at 100 is associated with a vehicle 10 in accordance with various embodiments. In general, the lidar system 100 incorporates an automatic, in-flight lidar health monitoring system that leverages redundant point cloud measurements and a nearest neighbor method to find overlapping channels, and incorporates a compensation system that uses the overlapping channels to provide real-time measurement errors in the parameters of interest (e.g., reflectivity and distance) to self-compensate for the errors thereby enhancing a final point cloud accuracy.

Figure 1:
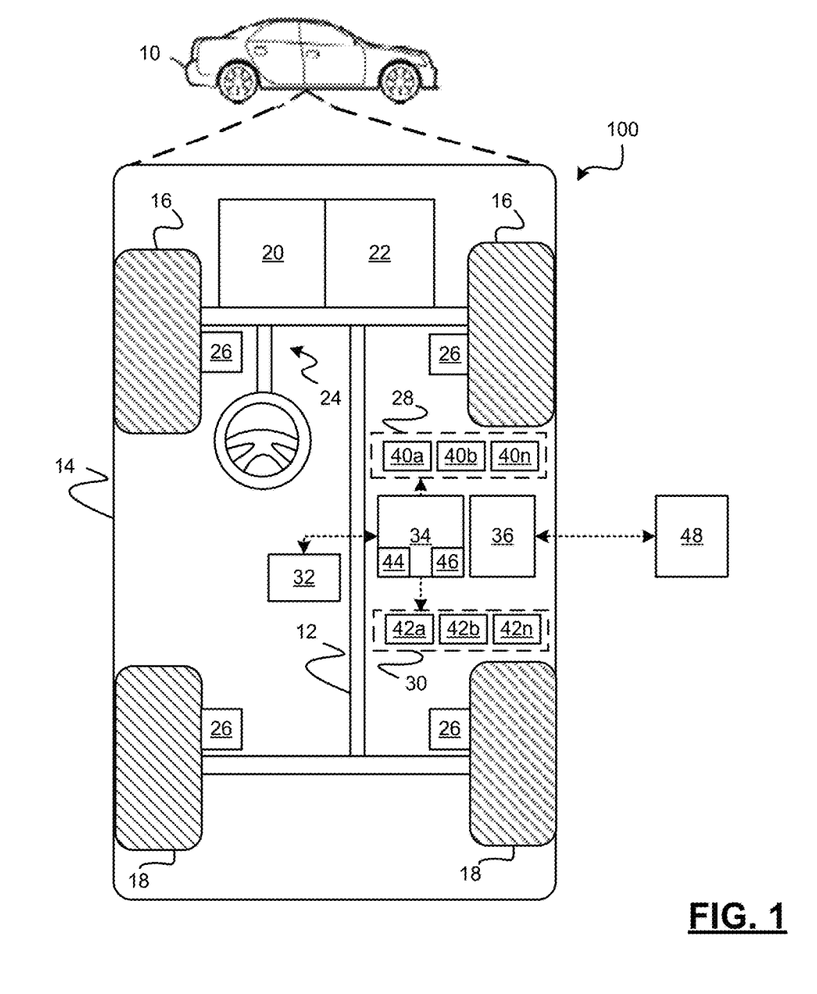
FIG. 1 is a functional block diagram illustrating an autonomous vehicle having a lidar system, in accordance with various embodiments.

As depicted in FIG. 1, the exemplary vehicle 10 generally includes a chassis 12, a body 14, front wheels 16, and rear wheels 18. The body 14 is arranged on the chassis 12 and substantially encloses components of the vehicle 10. The body 14 and the chassis 12 may jointly form a frame. The wheels 16-18 are each rotationally coupled to the chassis 12 near a respective corner of the body 14.

In various embodiments, the vehicle 10 is an autonomous or semi-autonomous vehicle and the lidar system 100 is incorporated into the autonomous or semi-autonomous vehicle 10 (hereinafter referred to as the autonomous vehicle 10). The autonomous vehicle 10 is, for example, a vehicle that is automatically controlled to carry passengers from one location to another. The vehicle 10 is depicted in the illustrated embodiment as a passenger car, but it should be appreciated that any other vehicle including motorcycles, trucks, sport utility vehicles (SUVs), recreational vehicles (RVs), marine vessels, aircraft, etc., can also be used. As can be appreciated, in various embodiments, the vehicle may be a non-autonomous vehicle and is not limited to the present examples.

As shown, the vehicle 10 generally includes a propulsion system 20, a transmission system 22, a steering system 24, a brake system 26, a sensor system 28, an actuator system 30, at least one data storage device 32, at least one controller 34, and a communication system 36. The propulsion system 20 may, in various embodiments, include an internal combustion engine, an electric machine such as a traction motor, and/or a fuel cell propulsion system. The transmission system 22 is configured to transmit power from the propulsion system 20 to the vehicle wheels 16-18 according to selectable speed ratios. According to various embodiments, the transmission system 22 may include a step-ratio automatic transmission, a continuously-variable transmission, or other appropriate transmission. The brake system 26 is configured to provide braking torque to the vehicle wheels 16-18. The brake system 26 may, in various embodiments, include friction brakes, brake by wire, a regenerative braking system such as an electric machine, and/or other appropriate braking systems. The steering system 24 influences a position of the of the vehicle wheels 16-18. While depicted as including a steering wheel for illustrative purposes, in some embodiments contemplated within the scope of the present disclosure, the steering system 24 may not include a steering wheel.

The sensor system 28 includes one or more sensing devices 40a-40n that sense observable conditions of the exterior environment and/or the interior environment of the autonomous vehicle 10. The sensing devices 40a-40n can include, but are not limited to, radars, lidars, global positioning systems, optical cameras, thermal cameras, ultrasonic sensors, and/or other sensors.

In exemplary embodiments described herein, one or more of the sensing devices 40a-40n are realized as a lidar device 40a. In this regard, the sensing devices 40a-40n may include or incorporate one or more emitters and one or more detectors. The emitters transmit light beams, which may be continuous-wave, pulsed, or modulated, into the environment of the vehicle 10; and the detectors detect reflections of the transmitted light beams off elements in the surrounding environment.

In various embodiments, the emitters and detectors are suitably configured to horizontally and rotatably scan the environment in the vicinity of the vehicle 10 via a scanning device having a particular angular frequency or rotational velocity. For example, the emitters and/or transmitters may utilize MEMs devices, rotating mirrors, micro motors, optical phased arrays (OPA), or other solid-state scanning methods to guide, transmit, emit, and collect the light waves. As used herein, a lidar scan should be understood as referring to a single revolution of a lidar device 40a and a scan rate indicates a rate at which the lidar device 40a completes the single revolution.

In various embodiments, the actuator system 30 includes one or more actuator devices 42a-42n that control one or more vehicle features such as, but not limited to, the propulsion system 20, the transmission system 22, the steering system 24, and the brake system 26. In various embodiments, the vehicle features can further include interior and/or exterior vehicle features such as, but are not limited to, doors, a trunk, and cabin features such as air, music, lighting, etc. (not numbered).

The data storage device 32 stores data for use in automatically controlling the autonomous vehicle 10. In various embodiments, the data storage device 32 stores defined maps of the navigable environment. In various embodiments, the defined maps may be predefined by and obtained from a remote system. For example, the defined maps may be assembled by the remote system and communicated to the autonomous vehicle 10 (wirelessly and/or in a wired manner) and stored in the data storage device 32. As can be appreciated, the data storage device 32 may be part of the controller 34, separate from the controller 34, or part of the controller 34 and part of a separate system.

Figure 2:
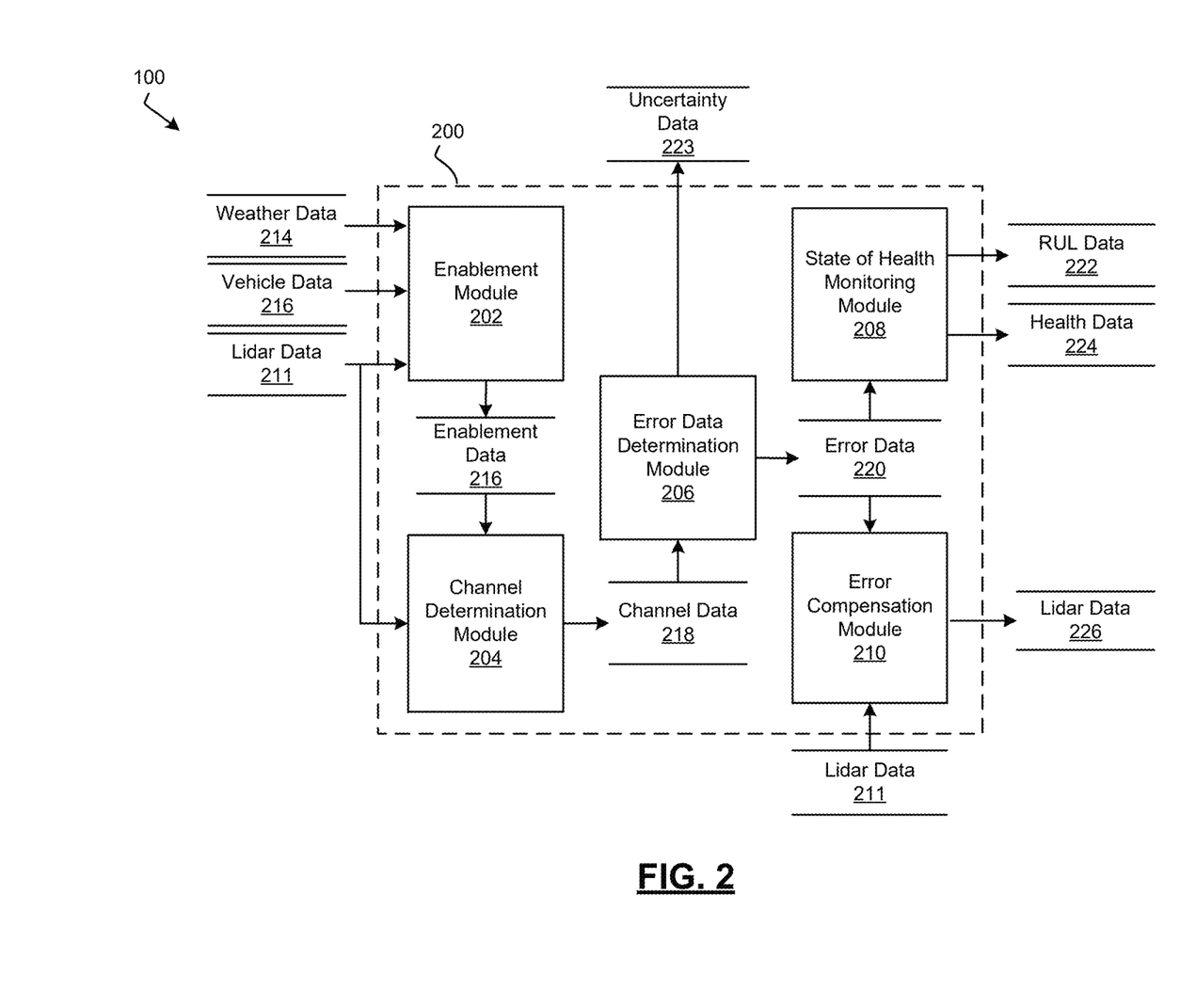
FIG. 2 is a dataflow diagram of a control module of the lidar system, in accordance with various embodiments.

The communication system 36 is configured to wirelessly communicate information to and from other entities 48, such as but not limited to, other vehicles ("V2V" communication) infrastructure ("V2I" communication), remote systems, and/or personal devices (described in more detail with regard to FIG. 2). In an exemplary embodiment, the communication system 36 is a wireless communication system configured to communicate via a wireless local area network (WLAN) using IEEE 802.11 standards or by using cellular data communication. However, additional, or alternate communication methods, such as a dedicated short-range communications (DSRC) channel, are also considered within the scope of the present disclosure. DSRC channels refer to one-way or two-way short-range to medium-range wireless communication channels specifically designed for automotive use and a corresponding set of protocols and standards.

The controller 34 includes at least one processor 44 and a computer readable storage device or media 46. The processor 44 can be any custom made or commercially available processor, a central processing unit (CPU), a graphics processing unit (GPU), an auxiliary processor among several processors associated with the controller 34, a semiconductor based microprocessor (in the form of a microchip or chip set), a macroprocessor, any combination thereof, or generally any device for executing instructions. The computer readable storage device or media 46 may include volatile and nonvolatile storage in read-only memory (ROM), random-access memory (RAM), and keep-alive memory (KAM), for example. KAM is a persistent or non-volatile memory that may be used to store various operating variables while the processor 44 is powered down. The computer-readable storage device or media 46 may be implemented using any of a number of known memory devices such as PROMs (programmable read-only memory), EPROMS (electrically PROM), EEPROMs (electrically erasable PROM), flash memory, or any other electric, magnetic, optical, or combination memory devices capable of storing data, some of which represent executable instructions, used by the controller 34 in controlling the autonomous vehicle 10.

The instructions may include one or more separate programs, each of which comprises an ordered listing of executable instructions for implementing logical functions. The instructions, when executed by the processor 44, receive and process signals from the sensor system 28, perform logic, calculations, methods and/or algorithms for automatically controlling the components of the autonomous vehicle 10, and generate control signals to the actuator system 30 to automatically control the components of the autonomous vehicle 10 based on the logic, calculations, methods, and/or algorithms. Although only one controller 34 is shown in FIG. 1, embodiments of the autonomous vehicle 10 can include any number of controllers 34 that communicate over any suitable communication medium or a combination of communication mediums and that cooperate to process the sensor signals, perform logic, calculations, methods, and/or algorithms, and generate control signals to automatically control features of the autonomous vehicle 10.

In various embodiments, one or more instructions of the controller 34 are embodied in the lidar system 100 and, when executed by the processor 44, cause the processor 44 to perform the methods and systems described in greater detail below. In particular, the instructions, when executed by the processor, perform the health monitoring and error compensation methods and systems as described herein.

With reference now to FIG. 2 and with continued reference to FIG. 1, an embodiment of a control module 200 of the lidar system 100 is shown which may be implemented by or incorporated into the controller 34, the processor 44, and/or the data storage device 32. In various embodiments, the control module 200 may be implemented as one or more sub-modules. As can be appreciated, the sub-modules shown and described may be combined and/or further partitioned in various embodiments. Data inputs to the control module 200 may be received directly from the sensing devices 40a-40n, received from other modules (not shown) of the controller 34, and/or received from other controllers (not shown). In various embodiments, the control module 200 includes an enablement module 202, a channel determination module 204, an error data determination module 206, a state of health monitoring module 208, and an error compensation module 210.

In various embodiments, the enablement module 202 receives as input lidar data 211, vehicle data 212, and/or weather data 214. The lidar data 211 includes a point cloud comprising reflectivity data, elevation data, azimuth data, and/or range/distance data. The data corresponds to points in the environment provided by one or more lidars. In various embodiments, as will be discussed in more detail below, the parameter of interest in the point cloud can be the reflectivity or the distance associated with the points. The vehicle data 212 includes, for example, data indicating a relative motion of the vehicle 10. The weather data 214 includes, for example, data indicating a level of moisture or precipitation in the environment. The enablement module 202 evaluates the received data 211, 212, and/or 214 to determine whether enable conditions for performing the monitoring and compensating have been met and sets enablement data 217 based thereon.

For example, in various embodiments, the enablement module 202 compares the weather data 214 to a threshold to determine whether a level of precipitation or moisture is too much (e.g., indicating fog or dense rain) to perform an accurate evaluation of the lidar data 211. In various embodiments, the enablement module 202 compares the reflectivity data to a threshold to determine whether the reflectivity level of objects is sufficient to perform an accurate evaluation of the lidar data 211. In various embodiments, the enablement module 202 compares the vehicle data 212 to a threshold to determine whether the relative motion of the vehicle 10 is low. When the enable conditions are met, the enablement module 202 sets the enablement data 217 to indicate enabled or true. Otherwise, the enablement data 217 indicates disabled or false.

In various embodiments, the channel determination module 204 receives as input the enablement data 217, and the lidar data 211. When the enablement data 217 indicates that the enablement conditions have been met, the channel determination module 204 identifies channels that overlap within the lidar data 211 and generates channel data 218 based thereon. In various embodiments, the channels of overlap can be channels from a single lidar or channels from two or more lidars that overlap. In various embodiments, the number of channels that overlap can be more than two in an overlapping region.

Figure 3:
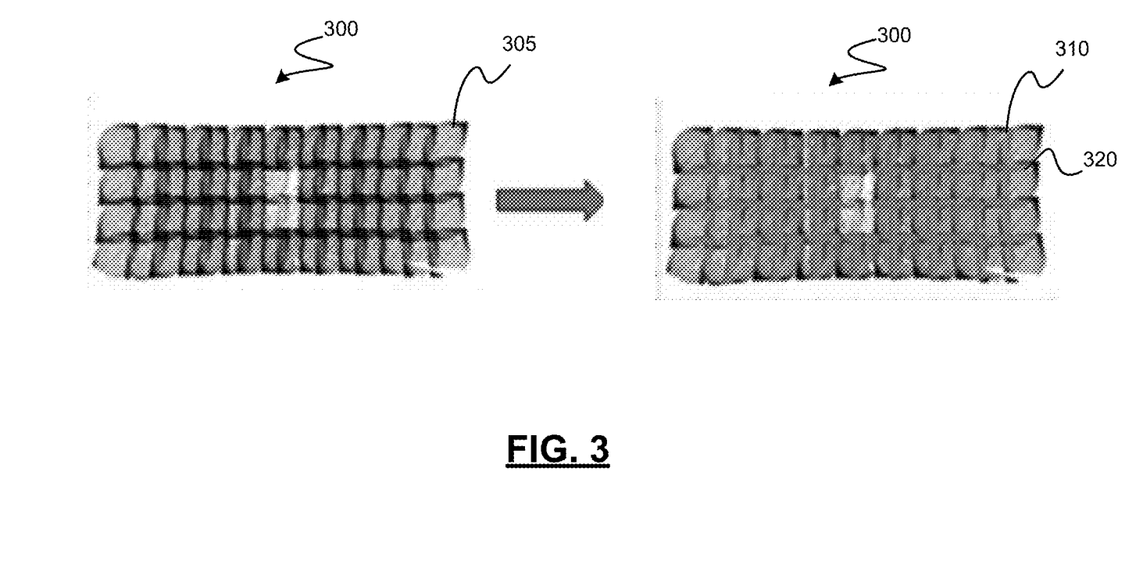
FIG. 3 is a graph illustrating lidar return data and the identified channels, in accordance with various embodiments.

For example, in various embodiments, as shown in FIG. 3, the channel determination module 204 identifies channels 305 in the lidar data 300, and from the channels 305, identifies regions of overlap (hereinafter referred to as overlapping channels 310, 320) that include redundant data. In various embodiments, the channel determination module 204 determines the overlapping channels using the upper and lower azimuth and elevation limits of each channel. In various embodiments, the channel determination module 204 then performs a nearest neighbor method on each data point from the point cloud samples in the overlapping region, only using data from adjacent channels. If the distance to the nearest neighbor is within a threshold, the data points are added to the channel data 218.

With reference back to FIG. 2, in various embodiments, the error data determination module 206 receives as input the channel data 218. The error data determination module 206 pre-processes the channel data 218 by applying filters, for example, to filter the no return points, to remove saturated points, and to remove any outliers. Thereafter, the error data determination module 206 extracts one or more features of the pre-processed channel data. For example, the mean or median of the parameter of interest (e.g., distance or reflectivity) can be computed from all or a subset of the pre-processed channel data. In various embodiments, the subset can be obtained from an automatic clustering (in x, y, z coordinate) or from samples after removing the outliers.

The error data determination module 206 then forms a system of equations with errors as the unknowns. It is expected that the points in the overlapping regions share the same ground truth (GT) of the extracted feature (i.e., GT_value_i=GT_value_j for two overlapping channels i and j). A static error or an error as a function of other parameters (e.g., reflectivity or distance) is determined or even a more generalized function (function of ambient light, temperature, vibrations, etc.) is determined.

Using the channel errors for each channel yields:

$$\text{Measured\_value}_i + \text{error}_i = \text{Measured\_value}_j + \text{error}_j.$$

As mentioned above, the number of channels that overlap can be more than two in an overlapping region. Considering this equation for all overlapping regions provides an overdetermined system of equations where there are more equations (each for one overlapping region) than the unknowns (channel error values or functions). This overdetermined system of equations is used by the error data determination module 206 as the optimization framework.

In various embodiments, the error data determination module 206 then applies the least squares method to solve the overdetermined system of equations (e.g., to minimize the cost function to estimate the channel errors). The error data determination module 206 uses the error or fusion of the error with other parameters (e.g., distance and reflectivity) as the health indicator and generates error data 220 based thereon.

In various embodiments, the error data determination module 206 matures (e.g., computes a moving average of) the health indicators over new data points (e.g., from subsequent frames) to increase the confidence of the estimation. The error data determination module 206 determines a confidence value to the matured error data based on, for example, convergence rates. The error data determination module 206 provides the confidence data as part of the error data 220.

In various embodiments, the state of health monitoring module 208 receives as input the error data 220. The state of health monitoring module 208 compares the error data 220 to a threshold error to identify early degradation of the lidar data 211. When the error data 220 exceeds the threshold, the state of health monitoring module 208 generates health data 224 to notify a user of the degraded health of the lidar device 40a.

In various embodiments, the state of health monitoring module 208 stores the error data over time and performs a remaining useful life (RUL) estimation based thereon. The state of health monitoring module 208 generates RUL data 222 to notify a user of the current state of life of the lidar device 40a.

In various embodiments, the error compensation module 210 receives as input the error data 220, and the lidar data 211. The error compensation module 210 compensates for the errors in the lidar data 211 by correcting the parameters for each channel by adding the error to the selected parameter:

$$\text{Corrected\_value}_i = \text{Measured\_value}_i + \text{Error}_i.$$

The error compensation module 210 formulates a new point could of lidar data 226 with the corrected values. This self-compensation can help to minimize the effect of the degraded channels on the lidar output used for object detection before the lidar can be replaced or maintained. The error data 220 can also be used to initialize the optimization in the future.

Figure 4:
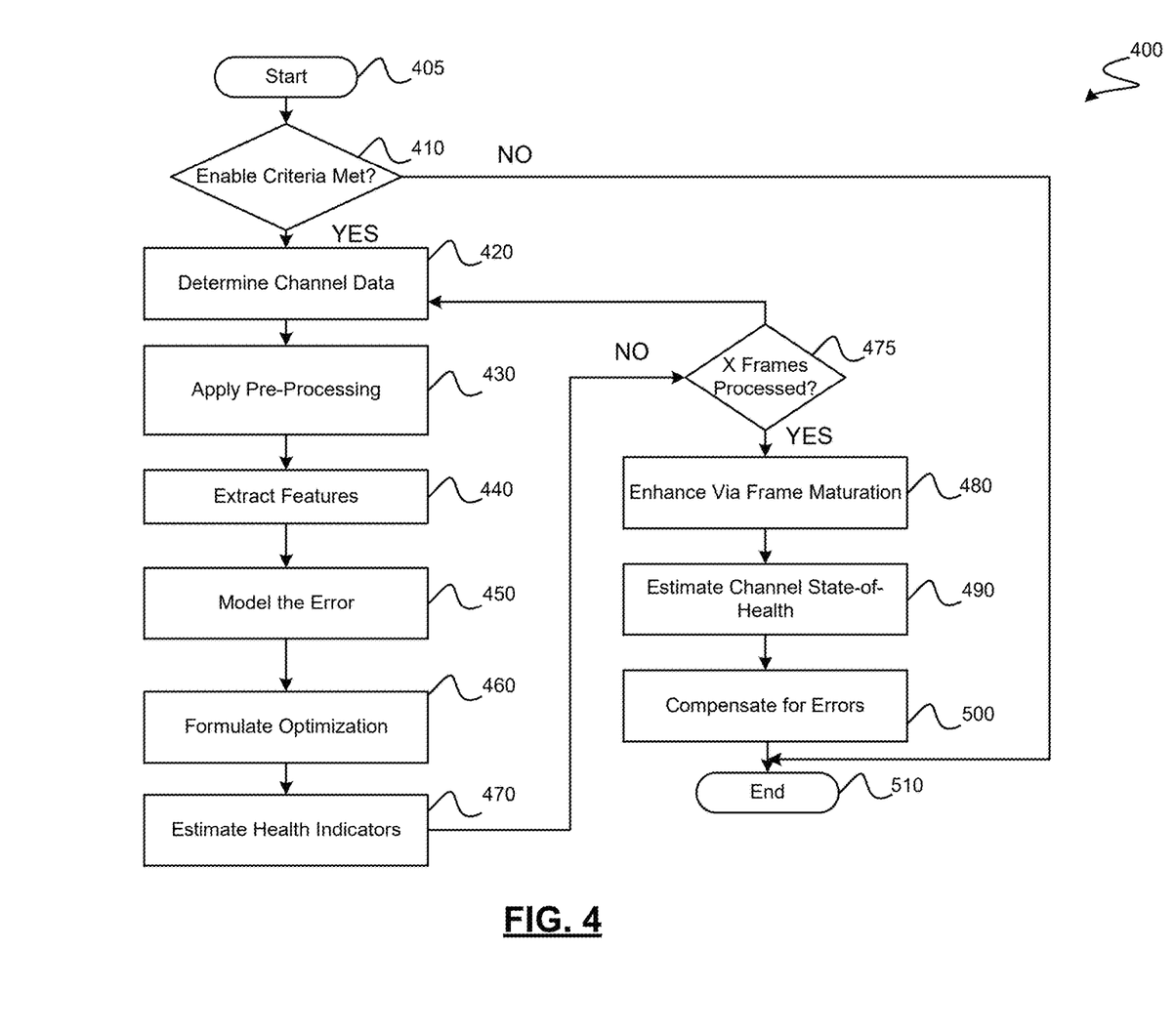
FIG. 4 is a flowchart illustrating a lidar monitoring method, in accordance with various embodiments.

Referring now to FIG. 4, and with continued reference to FIGS. 1-3 a flowchart illustrates various embodiments of a method 400 which may be embedded within a controller 34 in the lidar system 100 of FIG. 1 supporting the control module 200 of FIG. 2 in accordance with the present disclosure. As can be appreciated in light of the disclosure, the order of operation within the method is not limited to the sequential execution as illustrated in FIG. 4 but may be performed in one or more varying orders as applicable and in accordance with the present disclosure. In various embodiments, the method 400 can be scheduled to run based on one or more predetermined events, and/or can run continuously during operation of the vehicle 10.

In one example, the method 400 may begin at 405. The enabling criteria are evaluated at 410. For example, weather conditions, reflectivity, and/or relative motion of the vehicle 10 are compared to threshold values. When the enabling criteria have not been met at 410, the method 400 may end at 510.

When the enabling criteria have been met at 410, the overlapping regions of the channels and corresponding data are determined at 420. For example, the channels that overlap are identified using the upper and lower azimuth and elevation limits of each channel as discussed above. Thereafter, a nearest neighbor method is used to find the point cloud samples in the identified overlapping regions and the identified samples are pre-processed (e.g., no return points are filtered) at 430.

At 440, either all of the point cloud samples or a subset of the samples in the overlapping channels are used to extract features. A static error or an error as a function of other parameters (e.g., reflectivity or distance) is determined or even a more generalized function (function of ambient light, temperature, vibrations, etc.) is determined at 450. The optimization framework is determined at 460 using the overdetermined system of error equations for each channel. The least square method is applied to solve the optimization framework and find the error values for each channel and the error or a fusion of the error with other parameters (e.g., distance and reflectivity) is used as the health indicator at 470.

The health indicator is determined for a number of frames at 420-470 until a threshold number X has been computed at 475. Frame maturation (e.g., moving average) is applied to the computed health indicators over the X frames to increase the confidence and a confident value is assigned to the matured health indicator based on the convergence rates at 480.

A channel state of health is estimated at 490 by comparing the matured health indicator to a predefined threshold and/or by computing a remaining useful life (RUL) value. The parameters of interest are then compensated for in each channel by adding in the calculated error as discussed above at 500. Thereafter, the method 400 may end at 510.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof.

What is claimed is:

1. A method of controlling a vehicle, comprising: receiving, by a controller, return data generated by a lidar device of the vehicle; determining, by the controller, a region of at least one two overlapping channels of redundant return data by using an upper azimuth, a lower azimuth, and an elevation limit for each of the at least two overlapping channels and then performing a nearest neighbor method on each of a plurality of data points in the region of at least two overlapping channels, using only the redundant return data from adjacent channels; adding at least one of the plurality of data points to a set of channel data in response to a distance to a nearest neighbor being within a threshold distance; filtering the set of channel data to remove at least one of a no return point, a saturation point and an outlier to generate a preprocessed channel data; determining an error equation in response to the preprocessed channel data; determining, by the controller, an optimization framework of equations based on the error equation; solving, by the controller, the optimization framework of equations using at a least squares method to determine an error value; determining, by the controller, a state of health of the lidar device based on the error value; compensating, by the controller, the return data from the lidar device based on the error value; generating a data representative of an environment in a vicinity of the vehicle in response to the return data from the lidar device; generating, by the controller, a control signal in response to the data representative of the environment in the vicinity of the vehicle; and controlling, by the controller, the vehicle including at least one actuator system including a steering system, a brake system, and a propulsion system in response to the control signal.

2. The method of claim 1, further comprising:
   determining whether enable conditions are met; and
   in response to determining that the enable conditions have been met, performing the steps of determining the plurality of overlapping channels, determining the optimization framework of equations, determining the state of health, and the compensating the return data.

3. The method of claim 2, wherein the enable conditions include weather conditions.

4. The method of claim 2, wherein the enable conditions include a relative motion of the vehicle.

5. The method of claim 2, wherein the enable conditions include a reflectivity condition.

6. The method of claim 1, further comprising maturing, by the controller, the error value over a plurality of frames; and generating a confidence value based on the maturing, and wherein the determining the state of health is based on the confidence value.

7. The method of claim 1, wherein the at least one of the plurality of data points in the region of a least two overlapping channels have a same ground truth of an extracted feature.

8. The method of claim 7, further comprising extracting at least one feature from the at least one overlapping channel based on at least one of a mean and a median of at least one of a distance and a reflectivity of the return data.

9. The method of claim 8, wherein the extracting the at least one feature is based on at least one of all of the pre-processed return data and a subset of the pre-processed return data, wherein the subset is obtained from at least one of automatic clustering and samples after removing the outliers.

10. The method of claim 9, further comprising modeling an error associated with at least one of reflectivity and distance of points of the at least one overlapping channel, and wherein the determining the optimization framework of equations is based on the error that is modeled.

11. A control system for controlling a vehicle, comprising: a non-transitory computer readable medium configured to store return data generated by a lidar device of the vehicle; and
a processor, onboard the vehicle and configured to, receive the return data, determine a region of at least two overlapping channels of redundant return data by using an upper azimuth, a lower azimuth, and an elevation limit for each of the at least two overlapping channels and then performing a nearest neighbor method on each of a plurality of data points in the region of at least two overlapping channels, using only the redundant return data from adjacent channels, adding at least one of the plurality of data points to a set of channel data in response to a distance to a nearest neighbor being within a threshold distance;
filter the set of channel data to remove at least one of a return point, a saturation point and an outlier to generate a preprocessed channel data;
extract at least one feature from the preprocessed channel data including at least one of a mean of a parameter of interest or a median of the parameter of interest, wherein the parameter of interest includes at least one of a reflectivity of a point within the region of at least two overlapping channels and a distance to the point within the region of at least two overlapping channels;
determine an error equation in response the preprocessed channel data including the at least one feature of interest, determine an optimization framework of equations based on the error equation, solve the optimization framework using a least squares method to determine an error value, determine a state of health of the lidar device based on the error value, compensate the return data from the lidar device based on the error value, generate a data representative of an environment in a vicinity of the vehicle in response to the return data from the lidar device, generate, by the controller, in response to the data representative of the environment in the vicinity of the vehicle, and control the vehicle including at least one actuator system including a steering system, a brake system, and a propulsion system in response to the control signal.

12. The control system of claim 11, wherein the processor is further configured to determine whether enable conditions are met, and in response to determining that the enable conditions have been met, perform the steps of determining the plurality of overlapping channels, determining the optimization framework, determining the state of health, and the compensating the return data.

13. The control system of claim 12, wherein the enable conditions include at least one of a weather condition, a relative motion of the vehicle condition, and a reflectivity condition.

14. The control system of claim 11, wherein the processor is further configured to mature the error value over a plurality of frames, and generate a confidence value based on the maturing, and wherein the processor is configured to determine the state of health based on the confidence value.

15. The control system of claim 11, wherein the at least one of the plurality of data points in the region of a least two overlapping channels have a same ground truth of an extracted feature.

16. The control system of claim 15, wherein the processor is further configured to extract at least one feature from the at least one overlapping channel based on at least one of a mean and a median of at least one of a distance and a reflectivity of the return data.

17. The control system of claim 16, wherein the processor is further configured to extract the at least one feature based on at least one of all of the pre-processed return data and a subset of the pre-processed return data, wherein the subset is obtained from at least one of automatic clustering and samples after removing the outliers.

18. The control system of claim 17, wherein the processor is further configured to model an error associated with at least one of reflectivity and distance of points of the at least one overlapping channel, and wherein the determining the optimization framework of equations is based on the error that is modeled.

19. A vehicle, comprising: a lidar device configured to generate return data; and a controller configured to, by a processor, receive the return data, determine a region of at least two overlapping channels of redundant return data, by using an upper azimuth, a lower azimuth, and an elevation limit for each of the at least two overlapping channels and then performing a nearest neighbor method on each of a plurality of data points in the region of at least two overlapping channels, using only the redundant return data from adjacent channels, adding at least one of the plurality of data points to a set of channel data in response to a distance to a nearest neighbor being within a threshold distance; filtering the set of channel data to remove at least one of a return point, a saturation point and an outlier to generate a preprocessed channel data; determining an error equation in response to the preprocessed channel data, determine an optimization framework of equations based on the error equation, solve the optimization framework using a least squares method to determine an error value, determine a state of health of the lidar device based on the error value, compensate the return data from the lidar device based on the error value, generating a lidar health indicator in response to the error value, computing a remaining useful life value of the lidar in response to the lidar health indicator, generating a data representative of an environment in a vicinity of the vehicle in response to the return data from the lidar device, generating, by the controller, in response to the data representative of the environment in the vicinity of the vehicle, generate a notification of remaining useful live life to a vehicle operator, and control the vehicle including at least one actuator system including a steering system, a brake system, and a propulsion system in response to the control signal.

20. The vehicle of claim 19 wherein the controller is further configured to, by the processor, extract at least one feature from the at least one overlapping channel based on at least one of a mean and a median of at least one of a distance and a reflectivity of the return data, model an error associated with at least one of reflectivity and distance of points of the at least one overlapping channel, and wherein the determining the optimization framework of equations is based on the error that is modeled.

* * * * *